(No Model.)
A. L. & L. J. BARTHELEMY.
SUGAR DRIER AND SIFTER.
No. 582,574. Patented May 11, 1897.
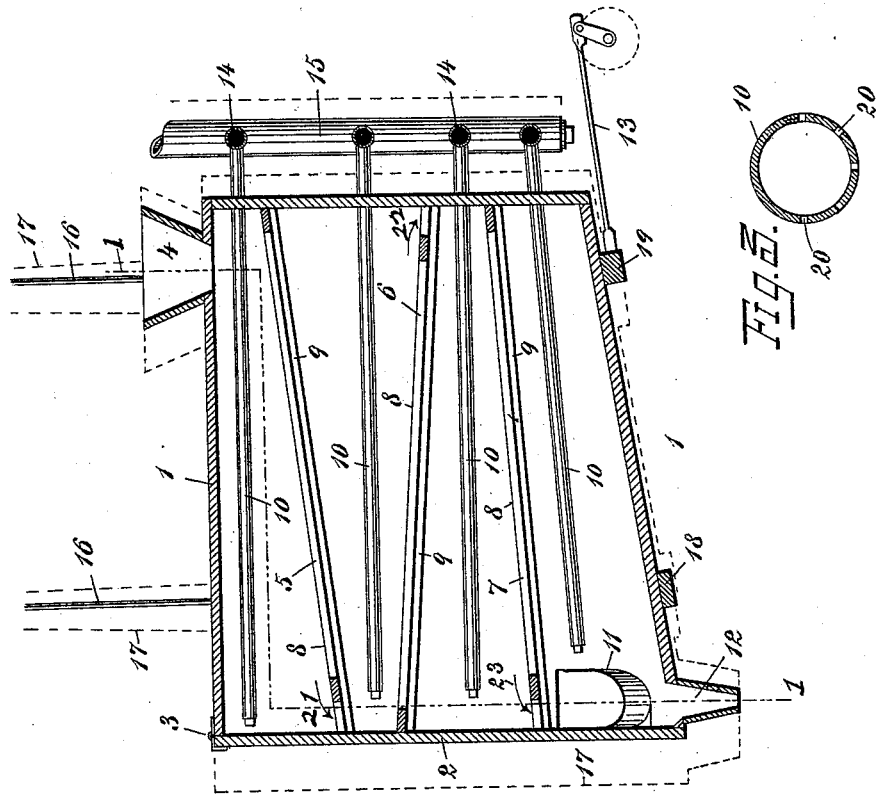
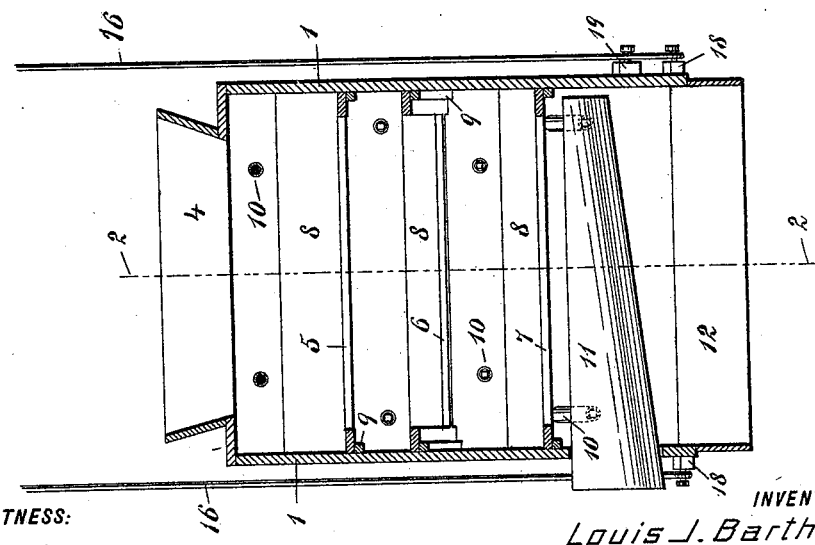
WITNESS:
Henry Graham
INVENTORS
Louis J. Barthelemy,
Aristide L. Barthelemy.
BY
ATTORNEY

UNITED STATES PATENT OFFICE.

ARISTIDE L. BARTHELEMY AND LOUIS J. BARTHELEMY, OF NEW ORLEANS, LOUISIANA.

SUGAR DRIER AND SIFTER.

SPECIFICATION forming part of Letters Patent No. 582,574, dated May 11, 1897.

Application filed September 3, 1896. Serial No. 604,805. (No model.)

*To all whom it may concern:*

Be it known that we, ARISTIDE L. BARTHELEMY and LOUIS J. BARTHELEMY, citizens of the United States, residing at New Orleans, in the parish of Orleans and State of Louisiana, have invented certain new and useful Improvements in Sugar Driers and Sifters; and we do hereby declare that the following is a full, clear, and exact description of the same, reference being had to the annexed drawings, making a part of this specification, and to the figures of reference marked thereon.

This invention relates to a sugar drier and sifter, and has for its object to provide a simple and efficient apparatus for the removal of lumps and scales and for the application of a hot-air blast during the sifting of the sugar, so that the sifted sugar will be made dry, bright, and lustrous and capable of keeping without becoming lumpy.

Our invention consists in features of construction and novel combinations of parts in a sugar drier and sifter, as hereinafter described and claimed.

In the annexed drawings, Figure 1 is a vertical cross-section of our improved sugar drier and sifter on the line 1 1 of Fig. 2. Fig. 2 is a vertical longitudinal section of the same on the line 2 2 of Fig. 1. Fig. 3 is an enlarged cross-section of one of the perforated hot-air pipes.

Referring to the drawings, the numeral 1 designates an oscillatory box that may be constructed from galvanized metal or other suitable material and of any size required. The front of the box 1 may be provided with a door 2, preferably suspended by hinges 3 at the top. One end of the box-top supports a hopper 4, through which the sugar to be dried and sifted is introduced into the box.

Within the box 1 is arranged a series of sifters 5, 6, and 7, that are alternately inclined in reverse directions from front to rear of the box. Each of these sifters consists of a rectangular frame of wood or metal supporting sifting-cloth 8, of any suitably-meshed material. In order to support these sifters, the inner sides of the box 1 are provided with cleats or bars 9, arranged at suitable inclinations. The front end of the box 1 is preferably deeper than the rear end to provide ample room for the required slant of the sifters. Any desired number of reversely-inclined sifters may be provided, and they may be arranged at any preferred inclination or slant. Between the several sifters and also above and below the same are placed a number of horizontally-arranged pipes 10, extended longitudinally and each perforated for admission of hot air into the box to dry the sugar during the sifting operation.

Across the lower front portion of the box 1 is arranged a trough 11 to trap the lumps and scales that pass down over the several sifters in succession. The trough 11 is inclined toward and extended through one side of the box 1, as shown, and thus serves to discharge the lumps of sugar into a barrel or other receptacle.

Below the trough 11 is an outlet 12 for discharge of sifted sugar that passes down to said outlet from over the inclined box-bottom, across the lower end of which the outlet 12 is extended. By means of connecting-rods 13 the box 1 is oscillated from eccentrics or cranks on a shaft of any suitable motor or power appliance, so as to agitate the sifters and thereby facilitate the sifting operation.

At their rear ends the hot-air pipes 10 are extended through the back of the box 1 and connect, by means of short pipes 14, with a manifold 15, through which hot air is to be supplied to the sugar-drier. Any properly-constructed heater may be provided for supplying hot air, which may be forced to the manifold 15 by a compressor, pump, or air-forcing device of any approved character. The manifold 15 may be connected with the source of hot-air supply by means of flexible tubing or hose connections to permit required oscillation of the drier, the manifold moving therewith, as indicated by dotted lines in Fig. 2, or the manifold may be stationary and the pipe connections 14 made flexible.

The drier and sifter box 1 is preferably suspended by means of rods 16, so that the box may be oscillated, as indicated by the dotted lines 17. Lugs 18 and 19 are provided on the box 1 for attachment of the suspending-rods 16 and the connecting-rods 13, through which the box is actuated.

In the hot-air pipes 10 there may be provided any required number of perforations 20 for properly distributing hot air throughout the drier during the sifting operation.

By reference to Fig. 2 it will be observed that passages or openings 21, 22, and 23 are provided at the lower ends of the successive inclined sifters 5, 6, and 7, so that during the sifting operation lumps can roll freely from the surface of an upper sifter onto the next lower one and from the lowest sifter into the trough 11, and thence to a barrel or other receptacle. Meanwhile by the oscillations of the box 1 the sifting of the fine sugar is greatly facilitated, and it finally passes from the inclined bottom of the box through the outlet 12 to any receptacle that may be provided for its reception. During the sifting operation the sugar is thoroughly dried out by contact with the hot air forced into the sifting and drying box. The sifted sugar is dry, bright, and lustrous and will keep indefinitely without becoming caked or lumpy.

What we claim as our invention is—

1. In a sugar drier and sifter, the combination of an oscillatory box, a series of inclined sifters arranged in said box one above another with an opening at the lower end of each sifter for passage of lumps and scales from the uppermost sifters to the lowermost sifters, in succession, a trough leading from beneath the lowermost of said openings to and through the side of said box to discharge the lumps and scales, an outlet for sifted sugar, and means for distributing hot air through said box to dry the sifted sugar, substantially as described.

2. In a sugar drier and sifter, the combination of an oscillatory box provided with an inclined bottom and having a hopper-inlet at the top, a series of sifters arranged in said box one above another and successively inclined in reverse directions, the said sifters being provided at their lower ends with openings or spaces for passage of lumps and scales from one sifter to another, an inclined trough for discharge of lumps and scales from the lowermost of said passages to the outside of the box, an outlet for discharge of sifted sugar from the inclined bottom of the box, and series of perforated hot-air pipes arranged in and movable with said box for drying the sugar during the sifting operation, substantially as described.

3. In a sugar drier and sifter, the combination of an oscillatory box having a hopper-inlet at the upper portion of one end and provided with an inclined bottom, a series of reversely-inclined sifters in said box one above another and each provided at its lower end with an opening for passage of lumps and scales, a trough for discharge of lumps and scales from beneath the lowermost of said openings, an outlet for discharge of sifted sugar from the inclined bottom of said box, perforated pipes arranged in said box for distribution of hot air therein, means for suspending the said box, and mechanism for oscillating the box, substantially as described.

In testimony whereof we have hereunto subscribed our names in the presence of two witnesses.

ARISTIDE L. BARTHELEMY.
LOUIS J. BARTHELEMY.

Witnesses:
WYNNE ROGERS,
STEPHEN MASCARO.